United States Patent [19]
Okada et al.

[11] Patent Number: 5,960,898
[45] Date of Patent: Oct. 5, 1999

[54] POWER SUPPLY UNIT AND ELECTRIC VEHICLE INCORPORATING THE SAME

[75] Inventors: Yasushi Okada; Satoshi Hiyama; Atsushi Inaba; Kouji Kawabe; Masanobu Urabe, all of Wako, Japan

[73] Assignee: Honda Giken Kogyo Kabushiki Kaisha, Tokyo, Japan

[21] Appl. No.: 08/928,324

[22] Filed: Sep. 12, 1997

[30] Foreign Application Priority Data

Sep. 13, 1996 [JP] Japan .................................. 8-263771

[51] Int. Cl.$^6$ .................................................. B60K 1/00
[52] U.S. Cl. .................................... 180/65.8; 307/109
[58] Field of Search ............................ 180/65.1, 65.2, 180/65.3, 65.4, 65.5, 65.6, 65.7, 65.8; 307/71, 110, 109; 320/117, 116, 100; 323/282

[56] References Cited

U.S. PATENT DOCUMENTS

| | | | |
|---|---|---|---|
| 5,498,981 | 3/1996 | Okamura et al. | 320/1 |
| 5,528,121 | 6/1996 | Okamura | 320/1 |
| 5,532,572 | 7/1996 | Okamura | 320/1 |
| 5,545,933 | 8/1996 | Okamura et al. | 307/109 |
| 5,604,426 | 2/1997 | Okamura et al. | 323/282 |
| 5,734,205 | 3/1998 | Okamura et al. | 307/110 |
| 5,808,427 | 9/1998 | Worden et al. | 180/65.1 |
| 5,818,115 | 10/1998 | Nagao | 180/65.1 |
| 5,834,854 | 11/1998 | Williams | 180/65.1 |
| 5,839,529 | 11/1998 | DePaoli | 180/65.1 |

FOREIGN PATENT DOCUMENTS

| | | |
|---|---|---|
| 51-7451 | 1/1976 | Japan . |
| 7-87687 | 3/1995 | Japan . |

*Primary Examiner*—Richard M. Camby
*Attorney, Agent, or Firm*—Lyon & Lyon LLP

[57] ABSTRACT

A power supply unit has a capacitor unit for supplying electric power to a load. The capacitor unit has at least two blocks each having a plurality of electric double-layer capacitors connected in series. The manner of connection of the at least two blocks is changed over between series connection and parallel connection in dependence on an output required by the load. A switching regulator is connected to the electric charge-storing device. An electric vehicle having the power supply unit installed thereon is also provided.

9 Claims, 17 Drawing Sheets

*FIG.5A1*
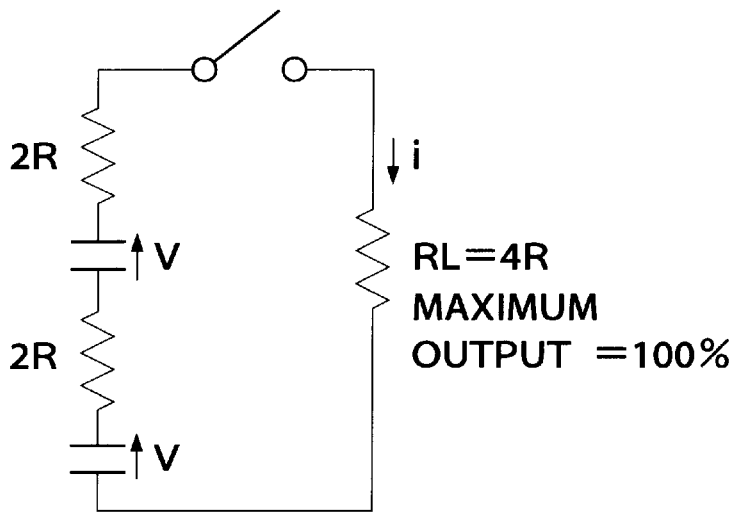
*FIG.5A2*
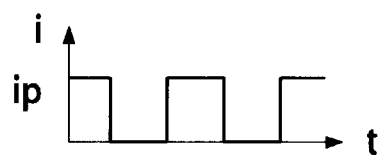
*FIG.5B1*
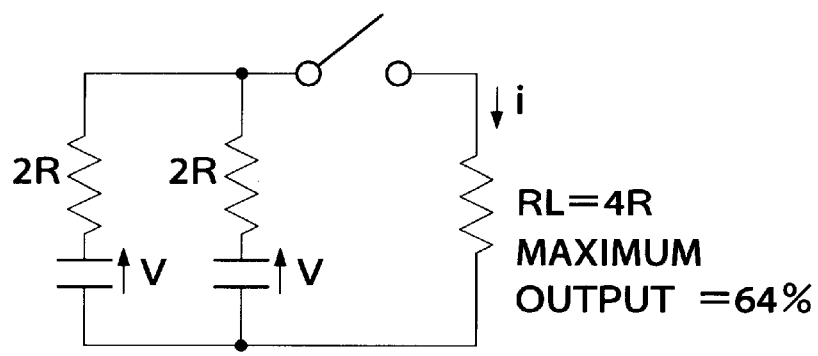
*FIG.5B2*
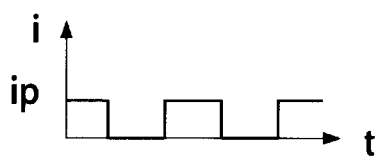

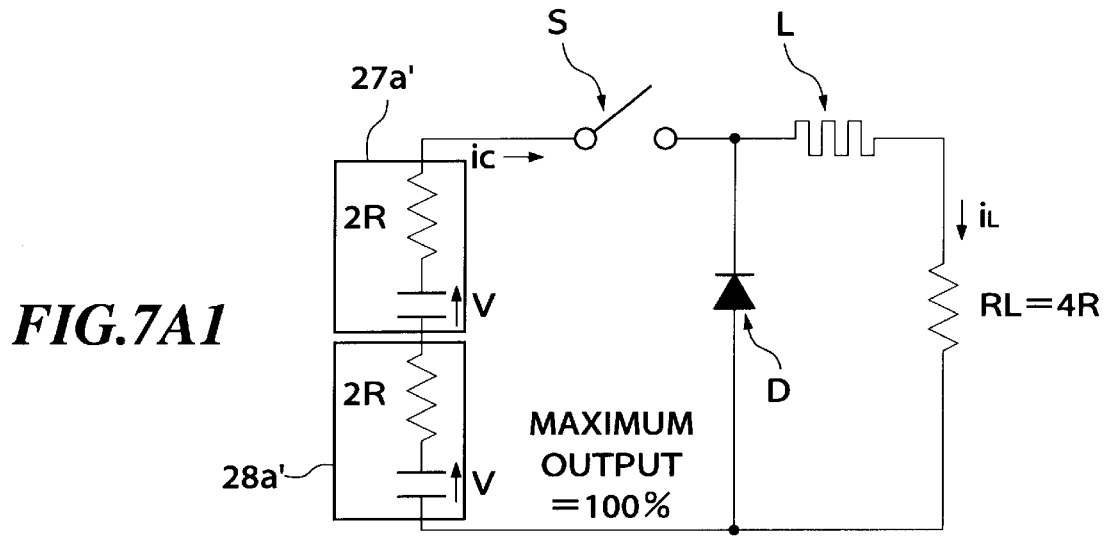
*FIG.7A1*
*FIG.7A2*
*FIG.7A3*
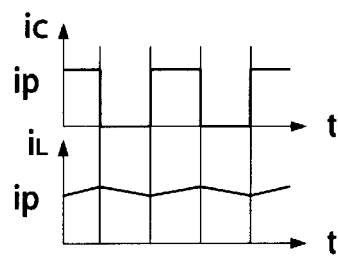
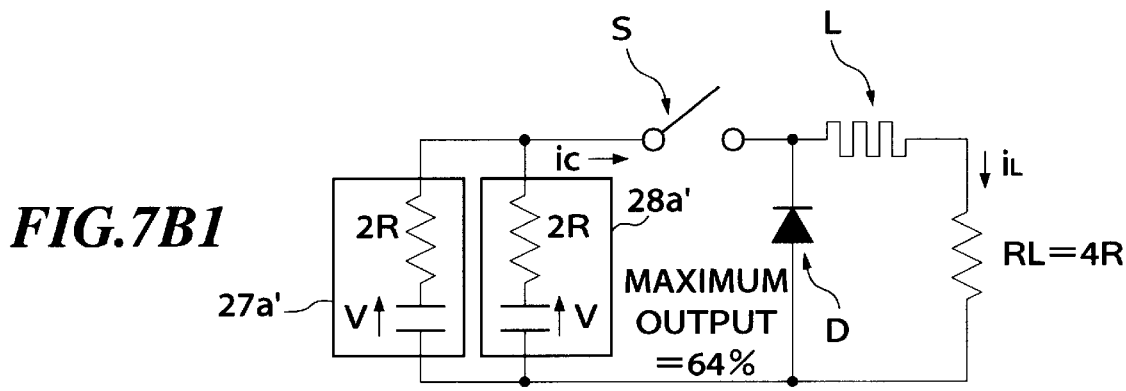
*FIG.7B1*
*FIG.7B2*
*FIG.7B3*
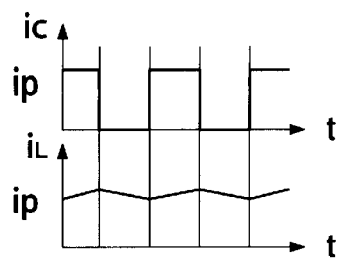

*FIG.9A1* 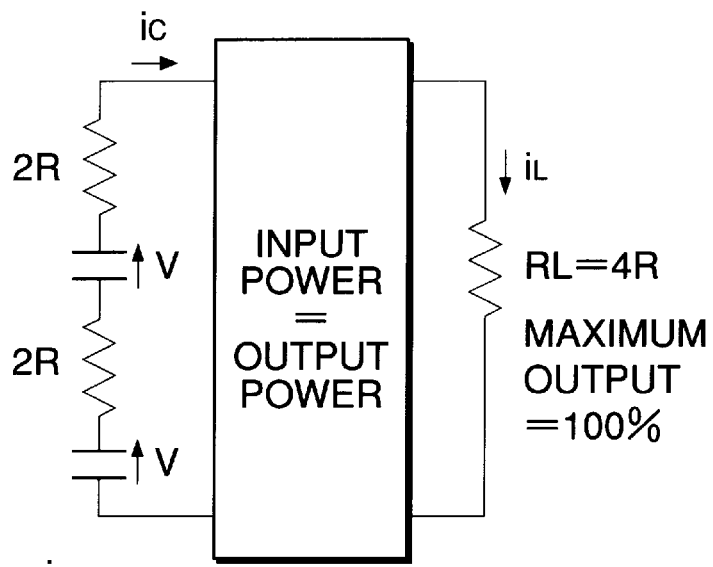
*FIG.9A2* 
*FIG.9A3* 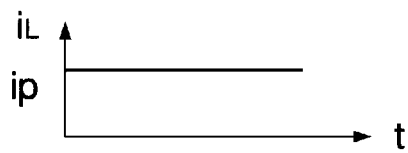
*FIG.9B1* 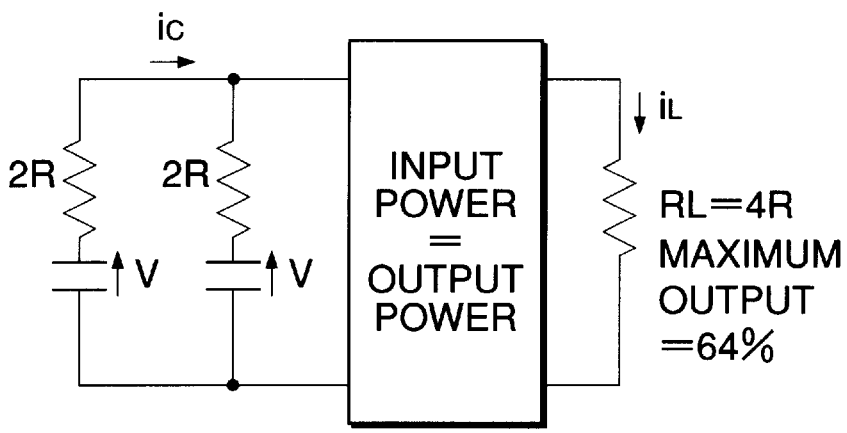
*FIG.9B2* 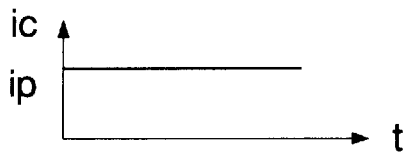
*FIG.9B3* 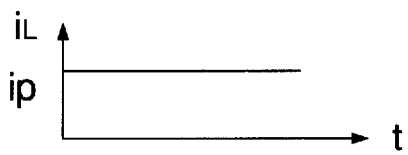

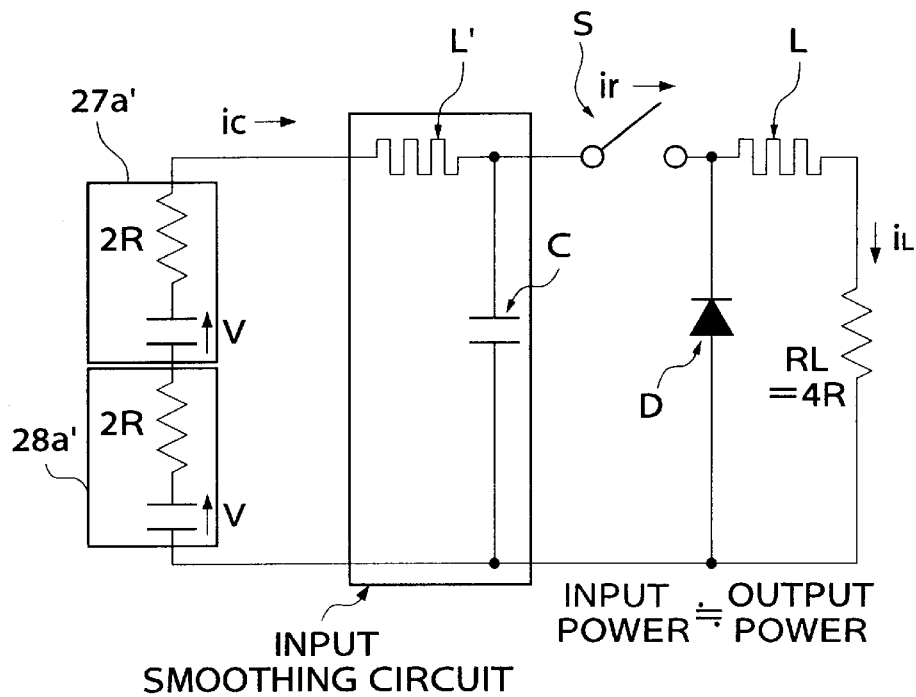
FIG.11A
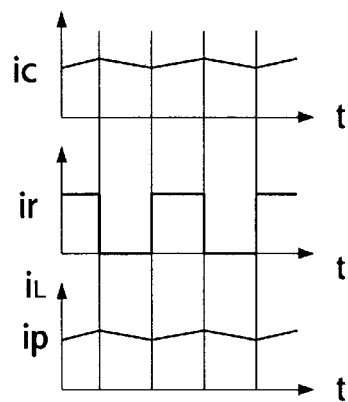
FIG.11B1
FIG.11B2
FIG.11B3

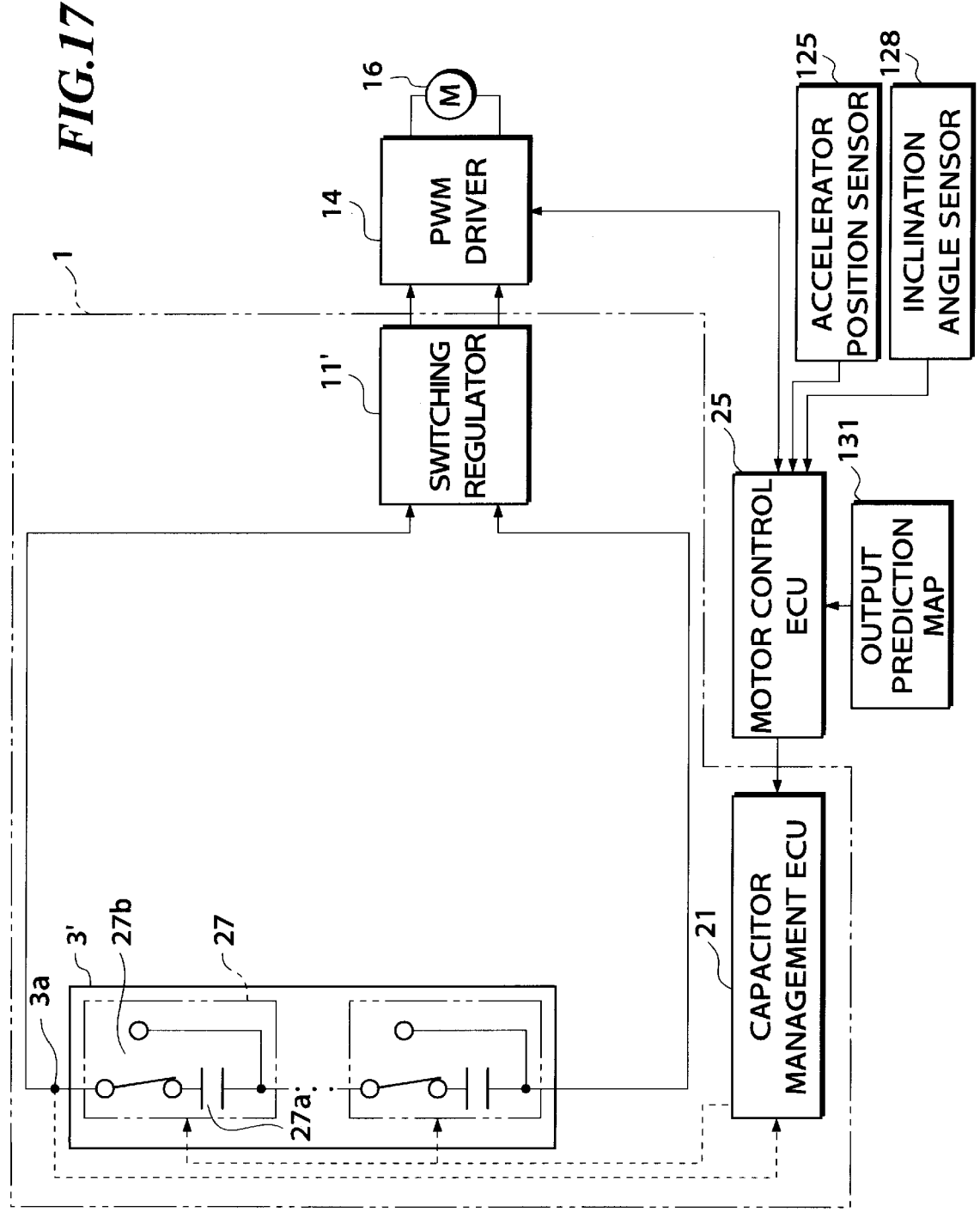

ns/. 5,960,898

POWER SUPPLY UNIT AND ELECTRIC VEHICLE INCORPORATING THE SAME

BACKGROUND OF THE INVENTION

1. Field of the Invention

This invention relates to a power supply unit and an electric vehicle incorporating the same.

2. Prior Art

Conventionally, as a power supply unit of this kind, a power supply circuit for an automotive vehicle has been proposed e.g. by Japanese Laid-Open Patent Publication (Kokai) No. 51-7451, which changes over the manner of connection of a plurality of batteries to supply electric power demanded by a starter of an internal combustion engine installed on an automotive vehicle. This power supply unit circuit includes two batteries each having an output voltage of 12 volts. The batteries are connected in series at the start of the engine to apply a voltage of 24 volts to the starter, whereas after the start of the engine, the batteries are connected in parallel to apply a voltage of 12 volts to other electric devices of the engine.

Further, a power supply unit has been proposed by Japanese Laid-Open Patent Publication (Kokai) No. 7-87687, which uses electric double-layer capacitors as a power source and supply power derived therefrom to an electrical appliance, such as a table lamp and a word processor, via a switching regulator.

However, the former employs two batteries, but does not employ a plurality of low-capacity electric double-layer capacitors connected in series. Therefore, the proposed electric circuit is not adapted to change the manner of connection of low-capacity capacitors to take out a necessary amount of power therefrom.

On the other hand, the latter is directed to a power supply unit for supplying electric power to an electrical appliance which consumes an almost constant amount of power, but not to one for an electric vehicle or the like of which the electric power consumption sharply fluctuates.

Further, if electric double-layer capacitors which are generally large in internal resistance are used in a power supply unit of an electric vehicle which consumes a large amount of electric power, there would arise a problem that an amount of heat generated within the capacitors is too large for the power supply unit to generate a sufficient output.

SUMMARY OF THE INVENTION

It is an object of the invention to provide a power supply unit which is capable of supplying a sufficient amount of electric power to an electric vehicle or the like by using low-capacity electric double-layer capacitors, and an electric vehicle incorporating the power supply unit.

To attain the above object, according to a first aspect of the invention, there is provided a power supply unit comprising:

a capacitor unit for supplying electric power to a load, the capacitor unit having at least two blocks each having a plurality of electric double-layer capacitors connected in series;

a selector switch for changing over a manner of connection of the at least two blocks between series connection and parallel connection in dependence on an output required by the load; and a switching regulator connected to the capacitor unit.

Preferably, the power supply unit is installed on an automotive vehicle, the power supply unit including operating condition-detecting means for detecting operating conditions of the automotive vehicle, and output-estimating means for estimating the output required by the load based on the operating conditions of the automotive vehicle detected by the operating condition-detecting means, the selector switch means changing over the manner of connection of the at least two blocks between the series connection and the parallel connection in dependence on the output estimated by the output-estimating means.

More preferably, the automotive vehicle has an accelerator pedal, the operating condition-detecting means including an accelerator position sensor for detecting a position of the accelerator pedal, and an inclination angle sensor for detecting a gradient of a road on which the automotive vehicle is traveling.

Preferably, the power supply unit includes command-receiving means for receiving a command concerning the output required by the load, the selector switch connecting the at least two blocks in the series connection when the command concerning the output is for increasing the electric power, and connecting the at least two blocks in the parallel connection when the command concerning the output is for giving priority to power conversion efficiency.

More preferably, the power supply unit includes voltage control means for controlling output voltage of the capacitor unit to a predetermined value to thereby supply the electric power to the load, and a voltage sensor for detecting the output voltage of the capacitor unit, the selector switch changing over the manner of connection of the at least two blocks from the parallel connection to the series connection when the output voltage of the capacitor unit is below the predetermined value.

More preferably, the power supply unit is installed on an automotive vehicle, the load comprising an electric motor, the power supply unit including a driver for driving the electric motor, and required output-detecting means for detecting the output required by the load based on an output from the driver, the selector switch changing over the manner of connection of the at least two blocks between the series connection and the parallel connection in dependence on the output detected by the required output-detecting means.

To attain the above object, according to a second aspect of the invention, there is provided an electric vehicle comprising:

a power supply unit for supplying electric power to a load, the electric charge-storing means having at least two blocks each having a plurality of electric double-layer capacitors connected in series, a selector switch for changing over a manner of connection of the at least two blocks between series connection and parallel connection, and an electric motor as the load to which the power supply unit supplies the electric power;

operating condition-detecting means for detecting operating conditions of the automotive vehicle; and a management ECU for causing the selector switch to change over the manner of connection of the at least two blocks between the series connection and the parallel connection based on the operating conditions of the automotive vehicle detected by the operating condition-detecting means.

Preferably, the automotive vehicle has an accelerator pedal, the operating condition-detecting means including an accelerator position sensor for detecting a position of the accelerator pedal, and an inclination angle sensor for detecting a gradient of a road on which the automotive vehicle is traveling.

To attain the above object, according to a third aspect of the invention, there is provided a power supply unit comprising:

a capacitor unit for supplying electric power to a load, the capacitor unit having a plurality of electric double-layer capacitors connected in series; and a switching regulator connected to the capacitor unit, the switching regulator including a smoothing circuit for smoothing ripples in an output voltage of the power supply unit, which is caused by switching operation of the switching regulator.

The above and other objects, features, and advantages of the invention will become more apparent from the following detailed description taken in conjunction with the accompanying drawings.

BRIEF DESCRIPTION OF THE DRAWINGS

FIG. 5A1 is a circuit diagram showing a simplified representation of a configuration of a simple switching circuit in a state of two capacitors thereof being connected in series;

FIG. 5A2 is a graph showing peak values ip of output current i flowing from the capacitors of the simple switching circuit in the FIG. 5A1 state;

FIG. 5B1 is a circuit diagram showing a simplified representation of a configuration of the simple switching circuit in a state of the two capacitors thereof being connected in parallel;

FIG. 5B2 is a graph showing peak values ip of output current i flowing from the capacitors of the simple switching circuit in the FIG. 5B1 state;

FIG. 7A1 is a circuit diagram showing a simplified representation of a configuration of a switching regulator circuit in a state of two capacitors thereof being connected in series;

FIG. 7A2 is a graph showing peak values ip of output current ic flowing from the capacitors of the switching regular circuit in the FIG. 7A1 state;

FIG. 7A3 is a graph showing peak values ip of load electric current iL flowing through a load of the switching regular circuit;

FIG. 7B1 is a circuit diagram showing a simplified representation of a configuration of the switching regulator circuit in a state of the two capacitors being thereof connected in parallel;

FIG. 7B2 is a graph showing peak values ip of output current ic flowing from the capacitors of the switching regular circuit in the FIG. 7B1 state;

FIG. 7B3 is a graph showing peak values ip of load electric current iL flowing through the load of the switching regular circuit;

FIG. 9A1 is a circuit diagram showing a simplified representation of a configuration of an ideal power conversion circuit in a state of two capacitors thereof being connected in series;

FIG. 9A2 is a graph showing peak values ip of output current ic flowing from the capacitors of the ideal power conversion circuit in the FIG. 9A1 state;

FIG. 9A3 is a graph showing peak values ip of load electric current iL flowing through the load of the ideal power conversion circuit;

FIG. 9B1 is a circuit diagram showing a simplified representation of a configuration of an ideal power conversion circuit in a state of two capacitors thereof being connected in parallel;

FIG. 9B2 is a graph showing peak values ip of output current ic flowing from the capacitors of the ideal power conversion circuit in the FIG. 9B1 state;

FIG. 9B3 is a graph showing peak values ip of load electric current iL flowing through the load of the ideal power conversion circuit;

FIG. 11A is a circuit diagram showing a simplified representation of a configuration of a switching regulator circuit incorporating an input smoothing circuit in a state of two capacitors thereof being connected in series;

FIG. 11B1 is a graph showing peak values ip of output current ic flowing from the switching regulator circuit incorporating the input smoothing circuit in the FIG. 11A state;

FIG. 11B2 is a graph showing peak values ip of ripple current ir flowing through the switching regulator circuit incorporating the input smoothing circuit in the FIG. 11A state;

FIG. 11B3 is a graph showing peak values ip of load current iL flowing through a load of the switching regulator circuit incorporating the input smoothing circuit;

FIG. 17 is a block diagram showing the arrangement of a power supply unit installed on an electric vehicle, according to a fourth embodiment of the invention.

DETAILED DESCRIPTION

The invention will now be described in detail with reference to the drawings showing embodiments thereof.

Figure 1:
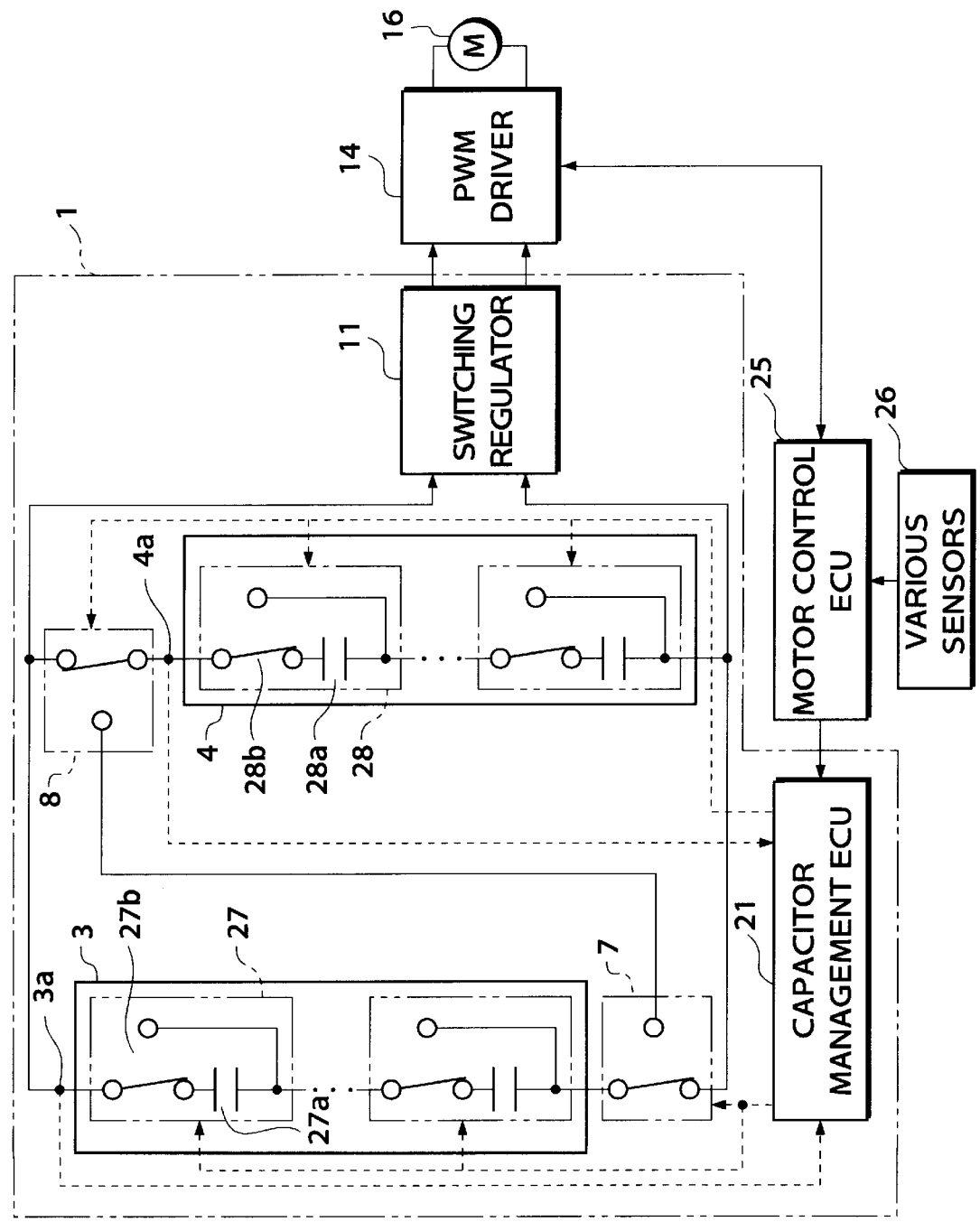
FIG. 1 is a block diagram showing the arrangement of a power supply unit installed on an electric vehicle, according to a first embodiment of the invention.

FIG. 1 shows the arrangement of a power supply unit installed on an electric vehicle, according to a first embodiment of the invention.

The electric vehicle includes a power supply unit 1, a pulse width-modulating driver (hereinafter referred to as "the PWM driver) 14, an electric motor 16, and a motor control ECU 25. The PWM driver 14 supplies the electric motor 16 with electric power in response to a control signal from the motor control ECU 25. The electric motor 16 transmits power to wheels, not shown, of the electric vehicle.

The power supply unit 1 is comprised of a pair of capacitor blocks 3, 4, selector switches 7, 8, a switching regulator 11, and a capacitor management ECU 21, and supplies the PWM driver 14 with a constant voltage. A circuit for charging the capacitor blocks 3, 4 is not shown or omitted from FIG. 1.

The capacitor blocks 3, 4 each have one hundred 3.5-volt capacitor cells 27, 28 connected in series to output a voltage of 350 volts when fully charged.

Each capacitor cell 27, 28 has an electric double-layer capacitor 27a, 28a and a bypass switch 27b, 28b. When the electric double-layer capacitor 27a or 28a is aged, the capacitor management ECU 21 operates the bypass switch 27b or 28b associated with the electric double-layer capacitor to thereby directly connect terminals of the capacitor cell 27 or 28, i.e. bypass the electric double-layer capacitor 27a or 28b.

The capacitor management ECU 21 is comprised of a CPU, a ROM, a RAM, a timer, an I/O interface, and a communication interface, all of which are well known.

The motor control ECU 25 is comprised of a CPU, a ROM, a RAM, a timer, an I/O interface, and a communication interface, all of which are well known, as well as various sensors 26 for detecting operating conditions of the electric vehicle. The motor control ECU 25 delivers a command to the capacitor management ECU 21 in response to the detected operating conditions of the electric vehicle via the communication interface. The sensors 26 for detecting operating conditions of the electric vehicle include a motor rotational speed-detecting sensor, a vehicle speed sensor, an accelerator position sensor, etc.

Figure 2:
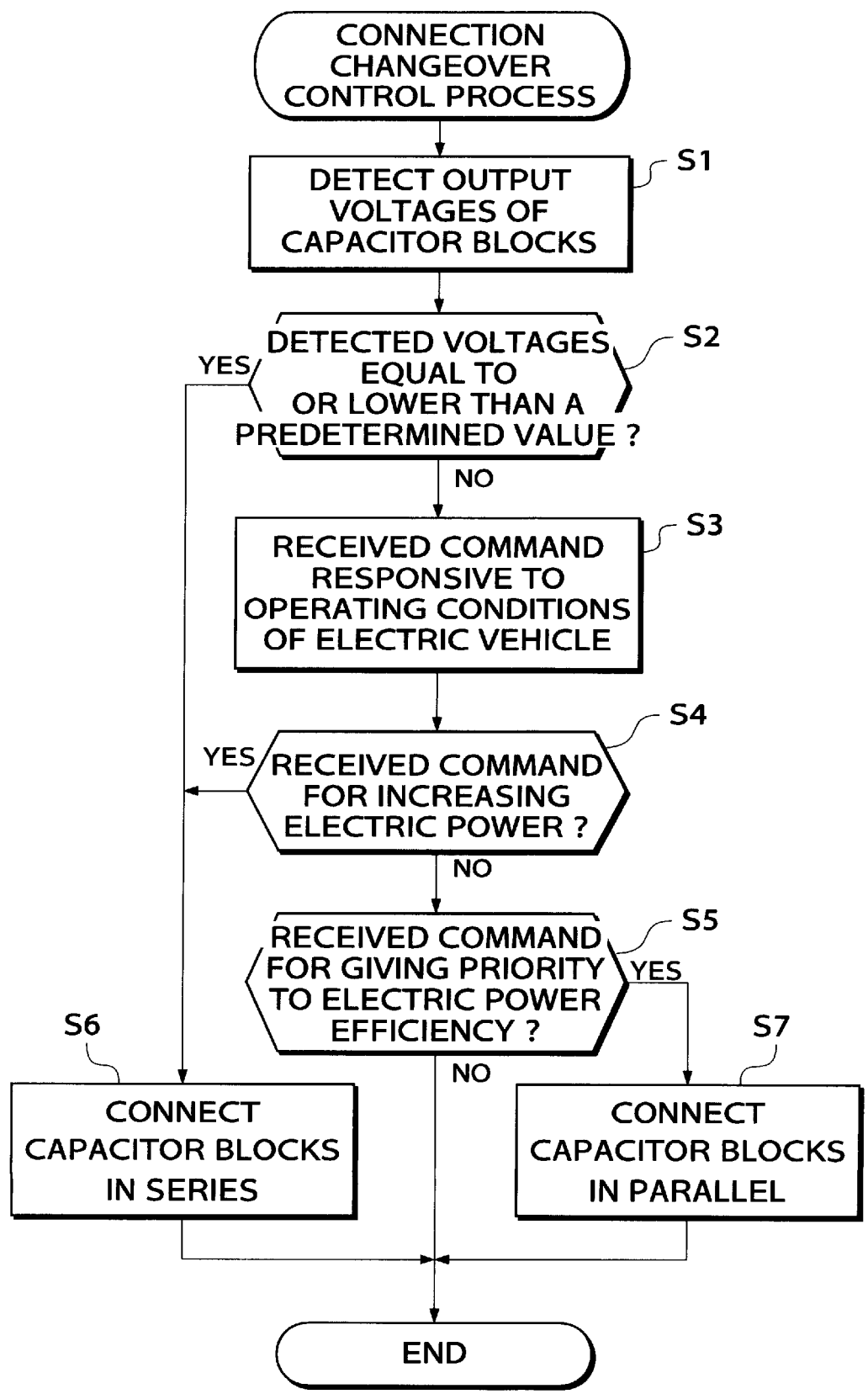
FIG. 2 is a flowchart showing a routine for carrying out a connection changeover control process executed by a capacitor management ECU 21 of the FIG. 1 power supply unit.
Figure 4:
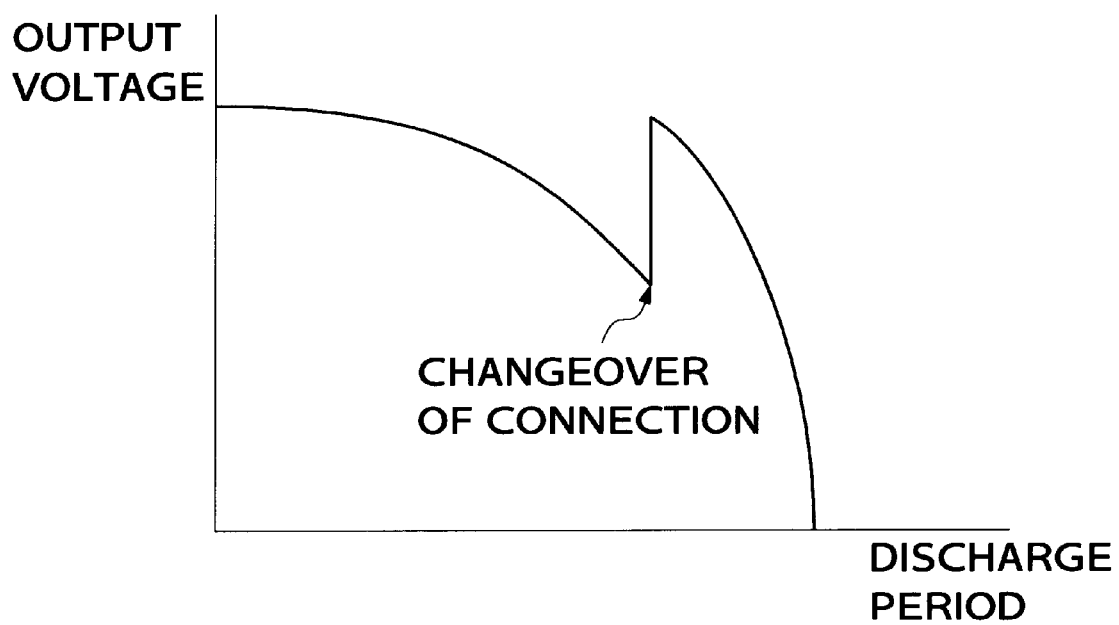
FIG. 4 is a graph showing the relationship between an output voltage of capacitors and a discharge period.

FIG. 2 shows a routine for carrying out a changeover control process executed by the capacitor management ECU 21. First, the capacitor management ECU 21 detects output voltages of the capacitor blocks 3, 4 (voltages at points 3a, 4a in FIG. 1) at a step S1, and determines at a step S2 whether or not any of the detected output voltages is equal to or lower than a predetermined value (100 volts in the present embodiment). If any of the voltages is equal to or lower than the predetermined value, the capacitor management ECU 21 operates the selector switches 7, 8 to thereby connect the pair of capacitor blocks 3, 4 in series at a step S6. FIG. 4 shows the relationship between the output voltage of the capacitors and a discharge period thereof. The output voltage of the capacitors decreases with the discharge period, but increases to a higher value at a time point the capacitor blocks 3, 4 are connected in series.

On the other hand, if the detected output voltages are higher than the predetermined value, the capacitor management ECU 21 receives a command responsive to an operating condition in which the electric vehicle is traveling, from the motor control ECU 25 at a step S3, and determines at a step S4 whether or not the received command is for increasing the electric power. If the received command is for increasing the electric power, e.g. if the command is one delivered by the motor control ECU 25 based on signals from the various sensors 26 under sudden acceleration when the electric vehicle is started on an ascending slope, the capacitor management ECU 21 connects the pair of capacitor blocks 3, 4 in series by operating the selector switches 7, 8 at the step S6.

On the other hand, if it is determined at the step S4 that the command responsive to the operating condition of the electric vehicle is not for increasing the electric power, then it is determined at a step S5 whether or not the command is for giving priority to the power conversion efficiency. If the command is for giving priority to the power conversion efficiency, e.g. if the command is one delivered by the motor control ECU 25 based on signals from the various sensors 26 when the electric vehicle is cruising, the capacitor management ECU 21 operates the selector switches 7, 8 to connect the pair of capacitor blocks 3, 4 in parallel at a step S7. If it is determined at the step S5 that the command is not for giving priority to the power conversion efficiency, the program is immediately terminated. The power conversion efficiency obtained when the capacitor blocks 3, 4 are connected in series or in parallel will be discussed in detail with respect to a second embodiment of the invention.

As described above, in the power supply unit and the electric vehicle according to the present embodiment, the capacitor blocks 3, 4 are connected in series or in parallel in response to commands from the motor control ECU 25, whereby it is made possible to selectively increase the amount of electric power or give priority to the power conversion efficiency in dependence on operating conditions of the electric vehicle.

Further, when the remaining amount of electric charge of the capacitor blocks 3, 4 becomes short, resulting in lowered output voltages of the capacitor blocks 3, 4, the voltage to be applied to the switching regulator 11 can be maintained at a sufficiently high level by connecting the capacitor blocks 3, 4 in series (see FIG. 4). For example, when the output voltages of the capacitor blocks 3, 4 are each in a range of 200 to 100 volts, the capacitor blocks 3, 4 are connected in parallel to apply the voltage in the range of 200 to 100 volts to the switching regulator 11. Further, when the output voltages of capacitor blocks 3, 4 are each in a range of 100 to 50 volts, it is possible to apply a voltage in the range of 200 and 100 volts to the switching regulator 11 by connecting the capacitor blocks 3, 4 in series. Therefore, it is possible to maintain a required voltage over a longer time period by connecting the capacitors 27, 28 in series. Further, it is also possible to expand the dynamic range of the switching regulator 11 even if its input voltage range is small.

Although in the present embodiment two capacitor blocks are used and selectively connected in series or in parallel, this is not limitative, but three or more capacitor blocks may be used for selectively effecting the series or parallel connection thereof. By connecting the three or more capacitor blocks in series, it becomes possible to continue operating the switching regulator 11 until the remaining amount of electric charge of each capacitor block becomes very small such that the output voltage lowers (see FIG. 4).

Next, a power supply unit according to a second embodiment of the invention will be described. This embodiment is identical in the arrangement of component elements and parts thereof with the first embodiment described above.

The power supply unit according to the present embodiment changes over the manner of connection of the capacitor blocks 3, 4 between series and parallel connections, based on an output from the motor 16 (required motor output). That is, the motor control ECU 25 delivers a command for changing over the manner of connection of the capacitor blocks 3, 4 to the capacitor management ECU 21 based on the output from the motor 16.

Figure 3:
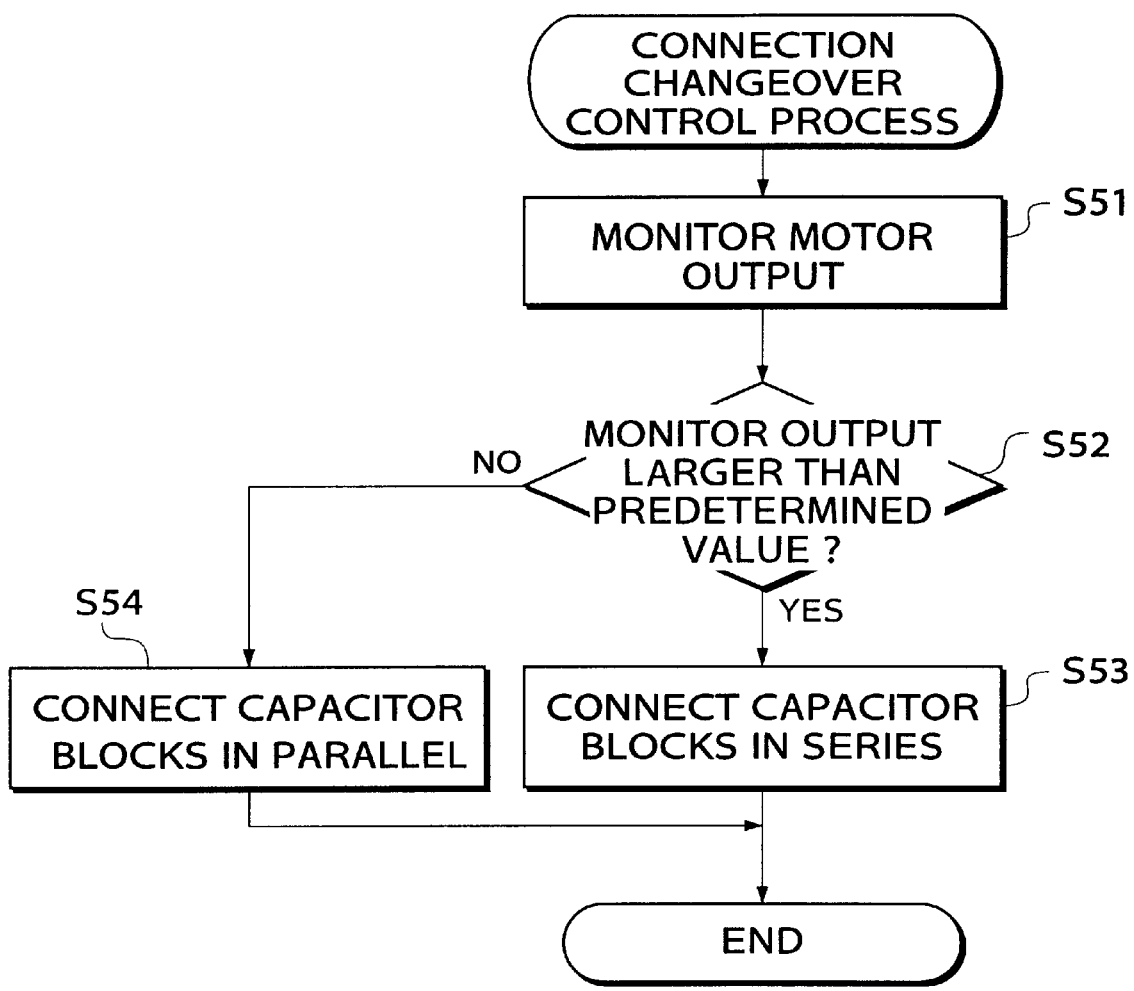
FIG. 3 is a flowchart showing a routine for carrying out a connection changeover control process executed by a motor control ECU 25 of a power supply unit according to a second embodiment of the invention.

FIG. 3 shows a routine for carrying out a connection changeover control process according to the second embodiment, which is executed by the motor control ECU 25.

The motor control ECU 25 detects at a step S51 an output from the PWM driver 14 which drives the electric motor 16, as the required motor output, and determines at a step S52 whether or nor the detected required motor output is larger than a predetermined value. If it is determined that the required motor output is larger than the predetermined value, the manner of connection of the capacitor blocks 3, 4 is changed over from parallel connection to series connection to increase the output voltage of the capacitors supplied to the switching regulator 51 at a step S53, whereas if it is determined that the required motor output is not larger than the predetermined value, the manner of connection of the capacitor blocks 3, 4 is changed over from series connection to parallel connection at a step S54.

Figure 6:
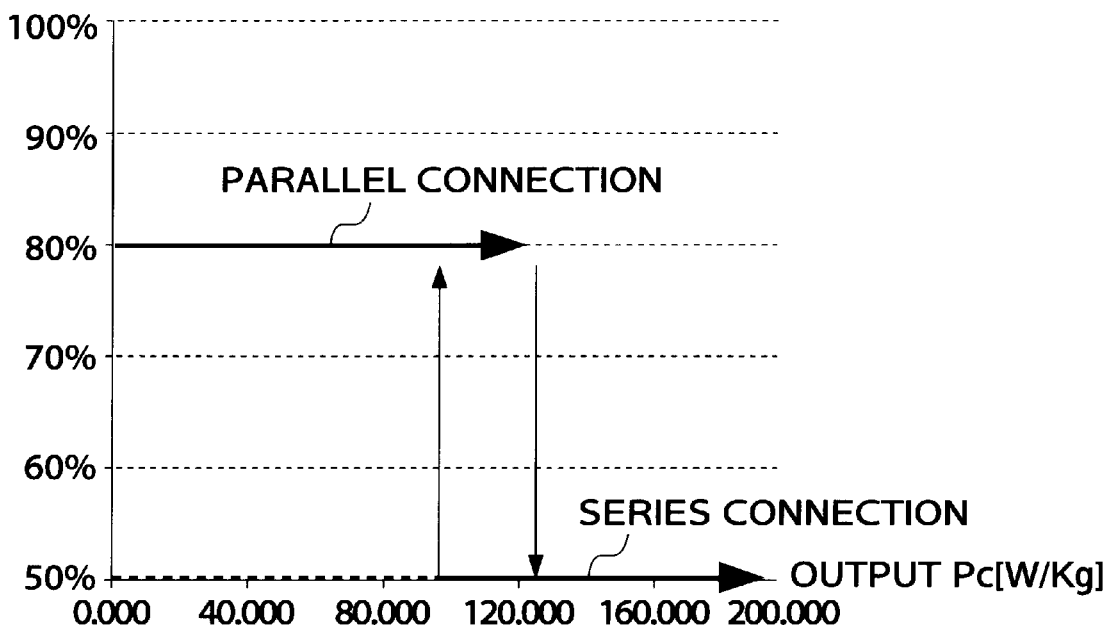
FIG. 6 is a graph showing the relationships between outputs from the capacitors of the simple switching circuit in the FIG. 5A1 and FIG. 5B1 states and respective power conversion efficiencies of the same.

Now, the power conversion efficiency of various circuits will be discussed. First, referring to FIGS. 5A1 to 5B2, a simple switching circuit with a resistance connected thereto as a load will be discussed. FIG. 5A1 shows a configuration of the simple switching circuit in a state of two capacitors thereof being connected in series, and FIG. 5A2 shows peak values (peak current) of output current from the capacitors, whereas FIG. 5B1 shows a configuration of the single switching circuit in a state of the capacitors being connected in parallel, and FIG. 5B2 shows peak values (peak current) of the output current from the capacitors. Assuming that the duty ratio of switching operation of this circuit is set to 100%, the power conversion efficiency with the capacitors connected in series is calculated to be 50% from the following equations (1A) to (1E), regardless of the output of the capacitors, whereas the power conversion efficiency with the capacitors connected in parallel is calculated to be 80% from the following equations (2A) to (2E), regardless of the output of the capacitors. FIG. 6 shows the relationship between the output of the capacitors and the power conversion efficiency under the conditions of internal resistance R=3.06 mΩ·Kg, output density=200 W·Kg, and DOD=80% (E=1.565 V):

$$ip=V/4R \tag{1A}$$

$$Pc=2V \times ip \times \text{Duty} \tag{1B}$$

$$Ploss=4R \times ip2 \times \text{Duty} \tag{1C}$$

$$Pout=Pc-Ploss \tag{1D}$$

$$\eta=Pout/Pc=1-2R \times ip/V=0.5 \tag{1E}$$

where ip represents peak current, Pc power taken out from the capacitors, Ploss internal loss power of the capacitors, Pout power output to load, η power conversion efficiency, and Duty duty ratio of switching operation of the switching circuit.

$$ip=V/5R \tag{2A}$$

$$Pc=V \times ip \times \text{Duty} \tag{2B}$$

$$Ploss=R \times ip2 \times \text{Duty} \tag{2C}$$

$$Pout=Pc-Ploss \tag{2D}$$

$$\eta=Pout/Pc=1-R \times ip/V=0.8 \tag{2E}$$

Figure 8:
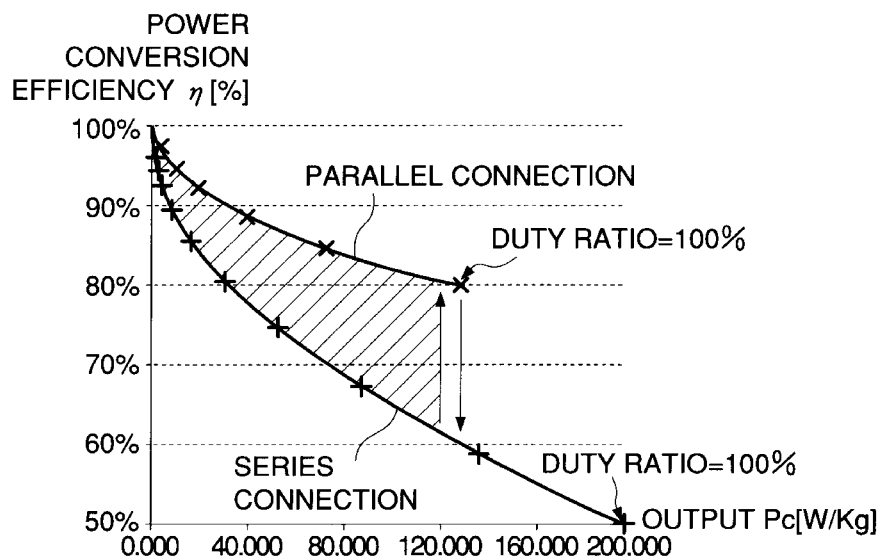
FIG. 8 is a graph showing the relationships between outputs from the capacitors of the switching regulator circuit in the FIG. 7A1 and FIG. 7B1 states and respective efficiencies of the same.

FIGS. 7A to 7B5 show a switching regulator circuit employed in the present embodiment and its characteristics. FIG. 7A1 shows a configuration of the switching regulator circuit in a state of two capacitors thereof being connected in series. FIG. 7A2 shows peak values of output current of the capacitors connected in series, and FIG. 7A3 shows peak values of load current 1L flowing into the load. FIG. 7B1 shows a configuration of the same circuit in a state of the capacitors being connected in parallel. FIG. 7B2 shows peak values of the output current of the capacitors connected in parallel, and FIG. 7B3 shows peak values of the load current flowing into the load. As shown in FIGS. 7A1 and 7B1, the switching regulator circuit is comprised of two capacitors 27a', 28a' (corresponding to the capacitor blocks in FIG. 1), a switching element S to which the capacitors 28a', 27a' are connected in series or in parallel, a diode D connected to the switching element S, and a smoothing coil L connected to between the switching elements S and the load RL. The switching element S, the diode D, and the coil L corresponds to component elements of the switching regulator 11 appearing in FIG. 1. FIG. 8 shows the relationship between the output of the capacitors and the power conversion efficiency under the same conditions in FIG. 6. From the following equations (3A) to (3F) which hold when the capacitors are connected in series, and the following equations (4A) to (4F) which hold when the capacitors are connected in parallel, it is understood that the power conversion efficiency varies with the output of the capacitors, but as a whole the switching regulator circuit is more efficient than the simple switching circuit. Further, the power conversion efficiency is higher when the capacitors are connected in parallel than when they are connected in series. Therefore, by changing over the manner of connection of the capacitor blocks from parallel connection to series connection only when a high output is required, it is possible to always enhance the power conversion efficiency as a whole:

$$Pc=2V \times ip \times \text{Duty} \tag{3A}$$

$$Ploss=4R \times ip2 \times \text{Duty} \tag{3B}$$

$$Pout=ip2 \times RL \tag{3C}$$

$$Pc=Ploss+Pout \tag{3D}$$

$$ip=2V \times \text{Duty}/(4R+RL/\text{Duty}) \tag{3E}$$

$$\eta=Pout/Pc \tag{3F}$$

$$Pc=V \times ip \times \text{Duty} \tag{4A}$$

$$Ploss=R \times ip2 \times \text{Duty} \tag{4B}$$

$$Pout = ip2 \times RL \quad (4C)$$

$$Pc = Ploss + Pout \quad (4D)$$

$$ip = V \times Duty/(R + RL/Duty) \quad (4E)$$

$$\eta = Pout/Pc \quad (4F)$$

Figure 10:
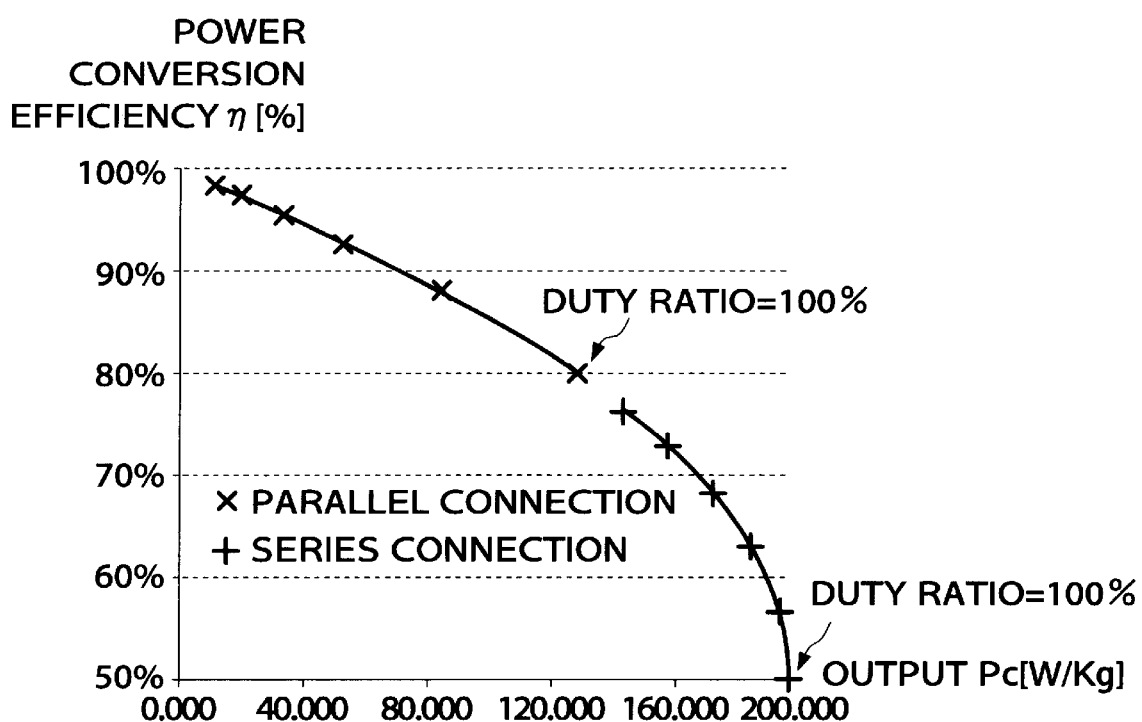
FIG. 10 is a graph showing the relationships between outputs from the capacitors of the ideal power conversion circuit in the FIG. 9A1 and FIG. 9B1 states and respective power conversion efficiencies of the same.

FIGS. 9A1 to 9B3 show an ideal power conversion circuit in which the input power is equal to the output power and the load current does not contain any ripple components, and its characteristics. FIG. 9A1 shows a configuration of the ideal power conversion circuit in a state of two capacitors thereof being connected in series. FIG. 9A2 shows peak values of output current of the capacitors connected in series, and FIG. 9A3 shows peak values of load current flowing into the load. FIG. 9B1 shows a configuration of the ideal conversion circuit in a state of the capacitors thereof being connected in parallel. FIG. 9B2 shows peak values of the output current of the capacitors connected in parallel, and FIG. 9B3 shows peak values of the load current flowing into the load. From the following equations (5A) to (5F) which hold when the capacitors are connected in series, and the following equations (6A) to (6F) which hold when the capacitors are connected in parallel, it is understood that the power conversion efficiency is the highest of all the types of exemplified circuits, in both of the two cases of the parallel connection and the series connection of the capacitors. FIG. 10 shows the relationship between the output of the capacitors of the ideal power conversion circuit and the power conversion efficiency under the same conditions in FIG. 6:

$$imax = V/2R \quad (5A)$$

$$i = k \times imax \ (k=0 \text{ to } 1) \quad (5B)$$

$$Pc = 2V \times ic \quad (5C)$$

$$Ploss = 4R \times ic2 \quad (5D)$$

$$Pout = Pc - Ploss \quad (5E)$$

$$\eta = Pout/Pc \quad (5F)$$

$$imax = V/5R \quad (6A)$$

$$i = k \times imax \ (k=0 \text{ to } 1) \quad (6B)$$

$$Pc = V \times ic \quad (6C)$$

$$Ploss = R \times ic2 \quad (6D)$$

$$Pout = Pc - Ploss \quad (6E)$$

$$\eta = Pout/Pc \quad (6F)$$

Figure 12:
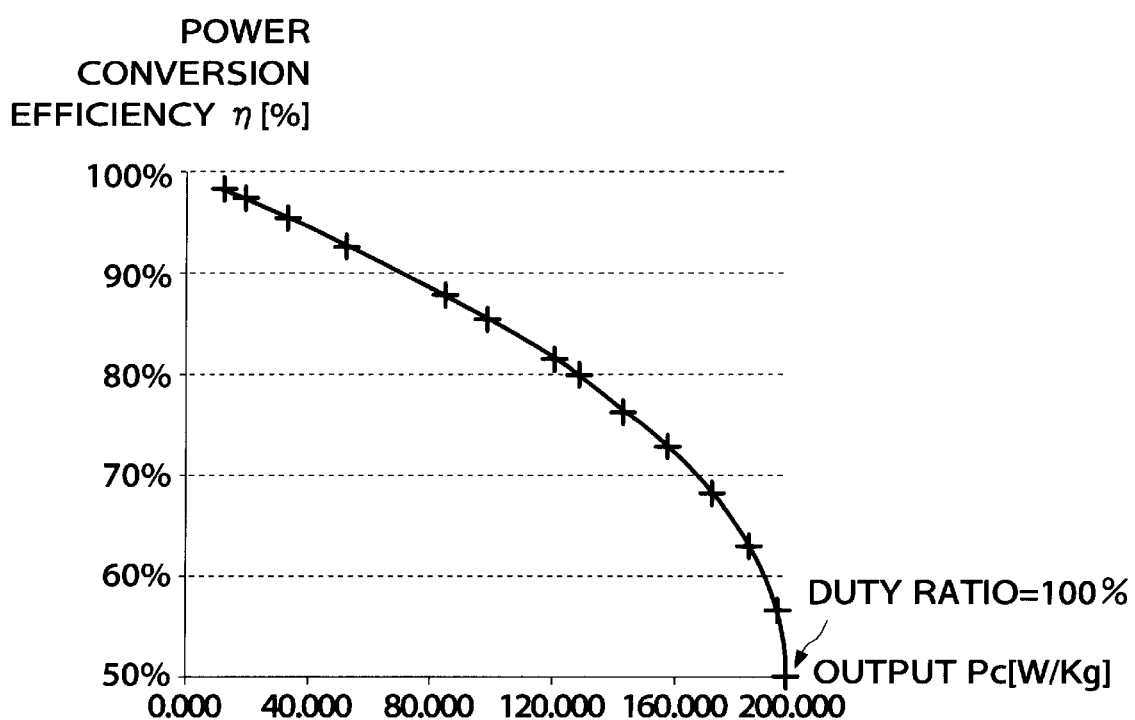
FIG. 12 is a graph showing the relationship between an output from the switching regulator circuit incorporating the input smoothing circuit and a power conversion efficiency of the same.

FIGS. 11A to 11B3 show a switching regulator circuit incorporating an input smoothing circuit and its characteristics. FIG. 11A shows a configuration of the switching regulator circuit in a state of two capacitors thereof being connected in series. FIG. 11B1 shows peak values of output current of the capacitors connected in series, and FIG. 11B2 shows peak values of ripple current, and FIG. 11B3 shows peak values of load current flowing into the load. As shown in FIG. 11A, the switching regulator circuit is distinguished from the FIG. 7A1 switching regulator circuit in that an input smoothing circuit comprised of a coil L' and a capacitor C is interposed between the capacitors 27a', 28a' connected in series and the switching element S. In this circuit, the input power is almost equal to the output power and at the same time ripples in the output power of the capacitors caused by the switching operation of the switching regulator are smoothed by the input smoothing circuit, so that this circuit can provide a high degree of power conversion efficiency which is close to that of the ideal power conversion circuit described above. FIG. 12 shows the relationship between the output of the capacitors of the switching regulator circuit incorporating the input switching circuit, and the power conversion efficiency of the same under the same conditions in FIG. 6.

Figure 13:
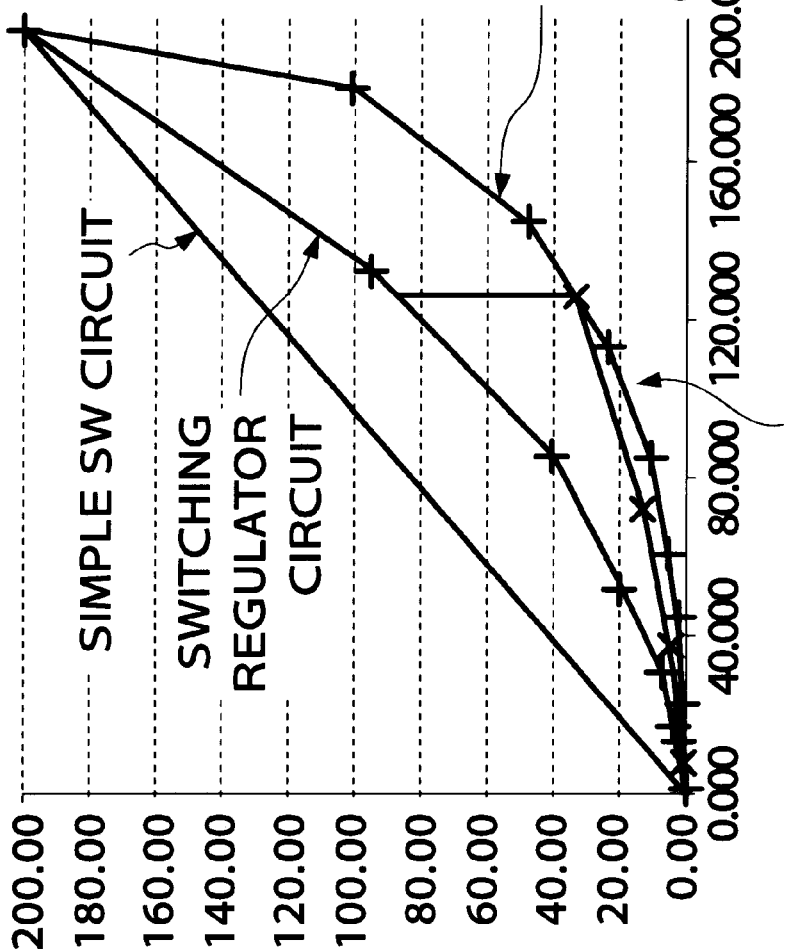
FIG. 13 is a graph showing the relationship between an output from each of the simple switching circuit, the switching regulator circuit, and the switching regulator circuit incorporating the input smoothing circuit, and an amount of heat generated by the capacitors thereof.

Now, the amounts of heat generated by the capacitors of the above-mentioned four types of circuits will be discussed. FIG. 13 shows the relationship between the amount of heat generated by the capacitors and the output of the capacitors. In all of the circuits, the amount of heat generated by the capacitors increases with an increase in the output of the capacitors. Of all the types of circuits, the capacitors of the simple switching circuit generate heat in an amount proportionate to the output of the capacitors and at the largest rate. The switching regulator circuit incorporating the input smoothing circuit, which is close in efficiency to the ideal power conversion circuit, generates heat at the smallest rate. In the first and second embodiments as well as a third embodiment of the invention, described hereinafter, the switching regulator circuit shown in FIGS. 7A1 to 7B3 is used, and by changing the manner of connection of the capacitors from parallel connection to series connection or vice versa in dependence on the required output, the whole amount of heat generated is reduced.

Therefore, if it is determined at the step S52 in the FIG. 3 routine described above that the required motor output is large, the switching regulator circuit changes over the manner of connection of the capacitors from parallel connection to series connection at the step S53, to obtain a required amount of power, whereas if it is determined that the required motor output is not large, the switching regulator circuit changes over the manner of connection of the capacitors from series connection to parallel connection at the step S54, to enhance the power conversion efficiency.

In the above described manner, according to the present embodiment, in an operating region where the required motor output is not large, the power conversion efficiency is enhanced to thereby reduce the amount of heat generated within the capacitors, whereby the maximum continuous output can be increased. In this case, the difference between the output voltage of the capacitors and the motor output voltage becomes small and hence the efficiency of the PWM driver 14 is improved. On the other hand, in an operating region where the required motor output is large, the capacitors can be caused to generate power to the limit of the capacity thereof. However, this mode of operation of producing the maximum output is permitted only for a short or limited time period due to a heat generated by the capacitors.

Although in the present embodiment, capacitors are used as a power source, and an output demanded by the load is determined from the motor output which is detected from the output from the PWM driver 14. This is not limitative, but instead of the motor output, the output from the switching regulator 11 can be detected as the output required by the load.

Further, the capacitors may be provided with one or more thermistors so as to protect them from overheating when they are connected in series by changing over the manner of connection of the capacitors from series connection to parallel connection if the temperature of the capacitors rises to a predetermined value. Further, the amount of heat generated by the capacitors may be calculated in advance, and when a cumulative value of the calculated amount of heat generated has reached a predetermined value, the connection of the capacitors may be changed from series connection to parallel connection.

Figure 14:
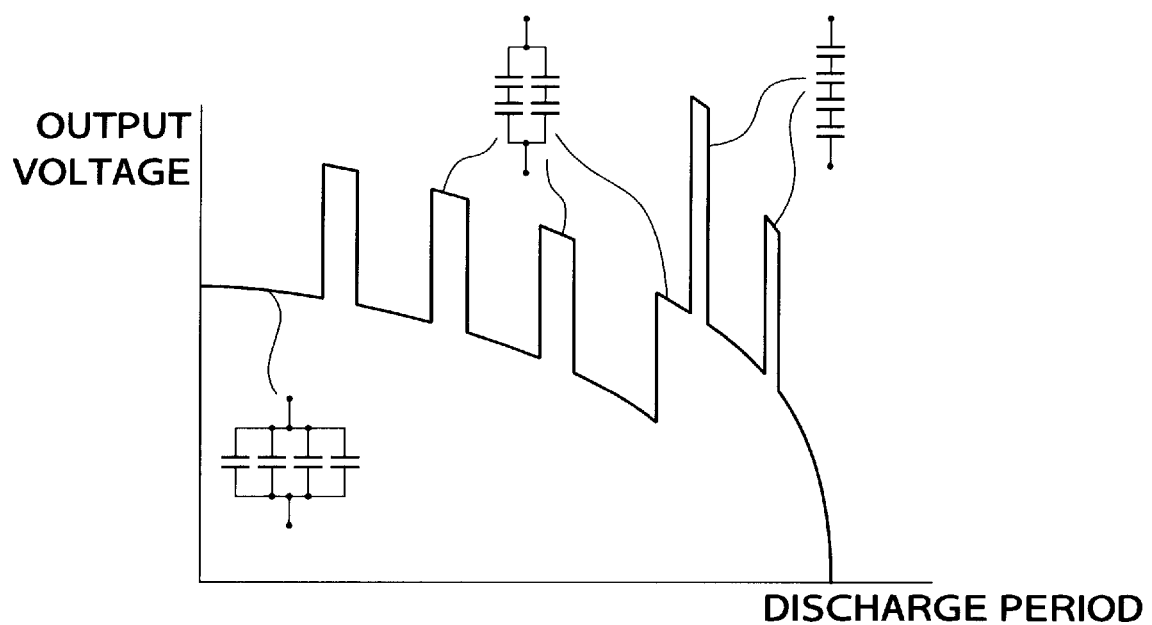
FIG. 14 is a graph showing the relationship between an output voltage of four capacitor blocks and a discharge period.

Although in the present embodiment, two capacitor blocks are employed, this is not limitative, but it is possible to employ four capacitor blocks. FIG. 14 shows the relationship between the output voltage of capacitors and the discharge period of the same when four capacitor blocks are employed. The manner of connection of the four capacitors is changed over between all four in parallel, two serially-connected pairs in parallel, and all four in series, according to the required motor output.

Figure 15:
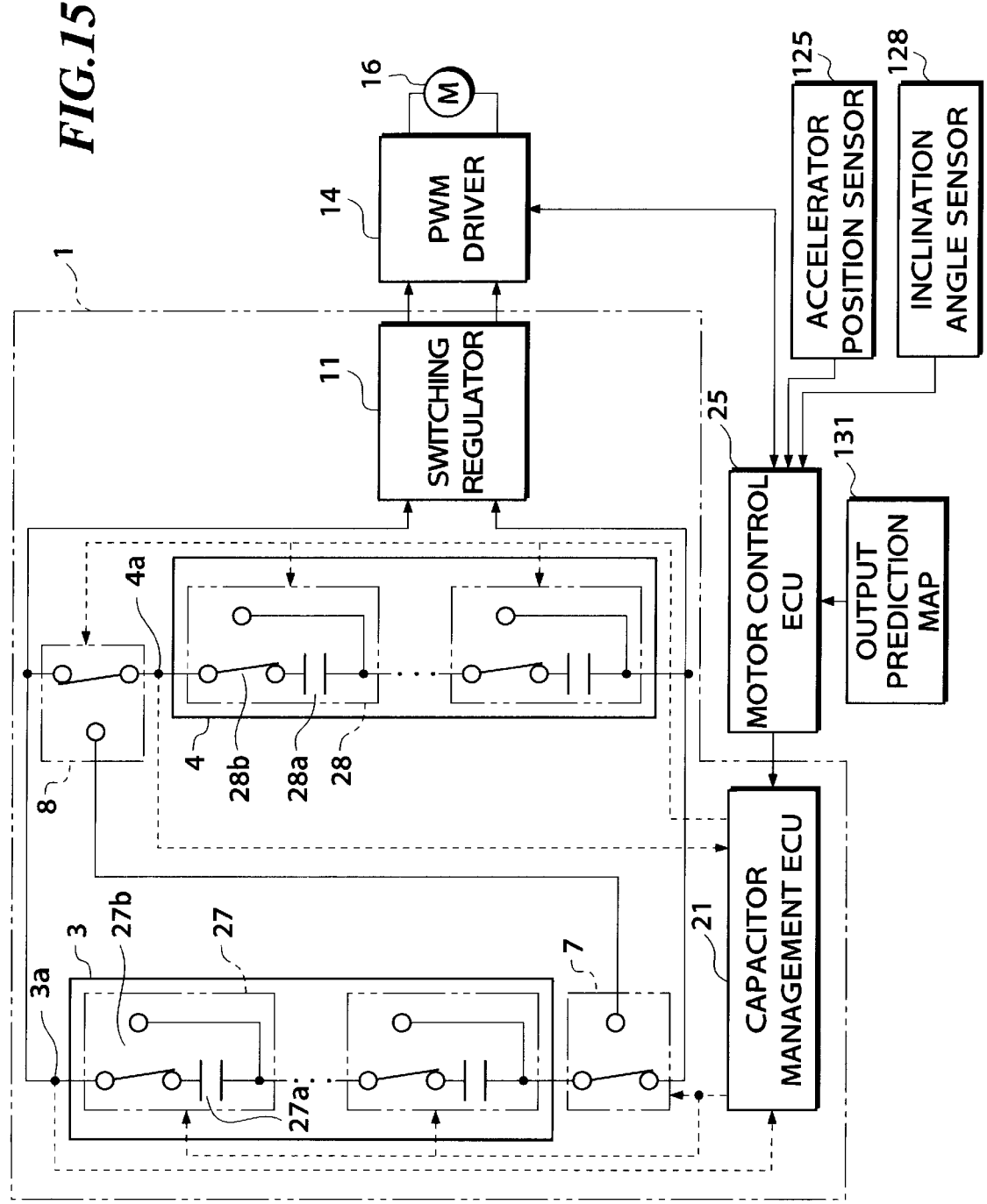
FIG. 15 is a block diagram showing the arrangement of a power supply unit installed on an electric vehicle, according to a third embodiment of the invention.

Next, a power supply unit according to the third embodiment of the invention will be described. FIG. 15 shows the arrangement of the power supply unit installed on an electric vehicle according to the third embodiment. Component elements and parts of the present embodiment corresponding to those of the first embodiment are designated by identical reference numerals, and detailed description thereof is omitted.

The motor control ECU 25 includes a CPU, a ROM, a RAM, a timer, an I/O interface, a communication interface, etc. which are well known. Connected to the motor control ECU 25 are an accelerator position sensor 125 for sensing the position or stepping-on amount of an accelerator pedal of the vehicle, an inclination angle (gradient) sensor 128 for sensing the gradient of a road on which the vehicle is traveling, and a storage device storing an output-prediction map 131.

Figure 16:
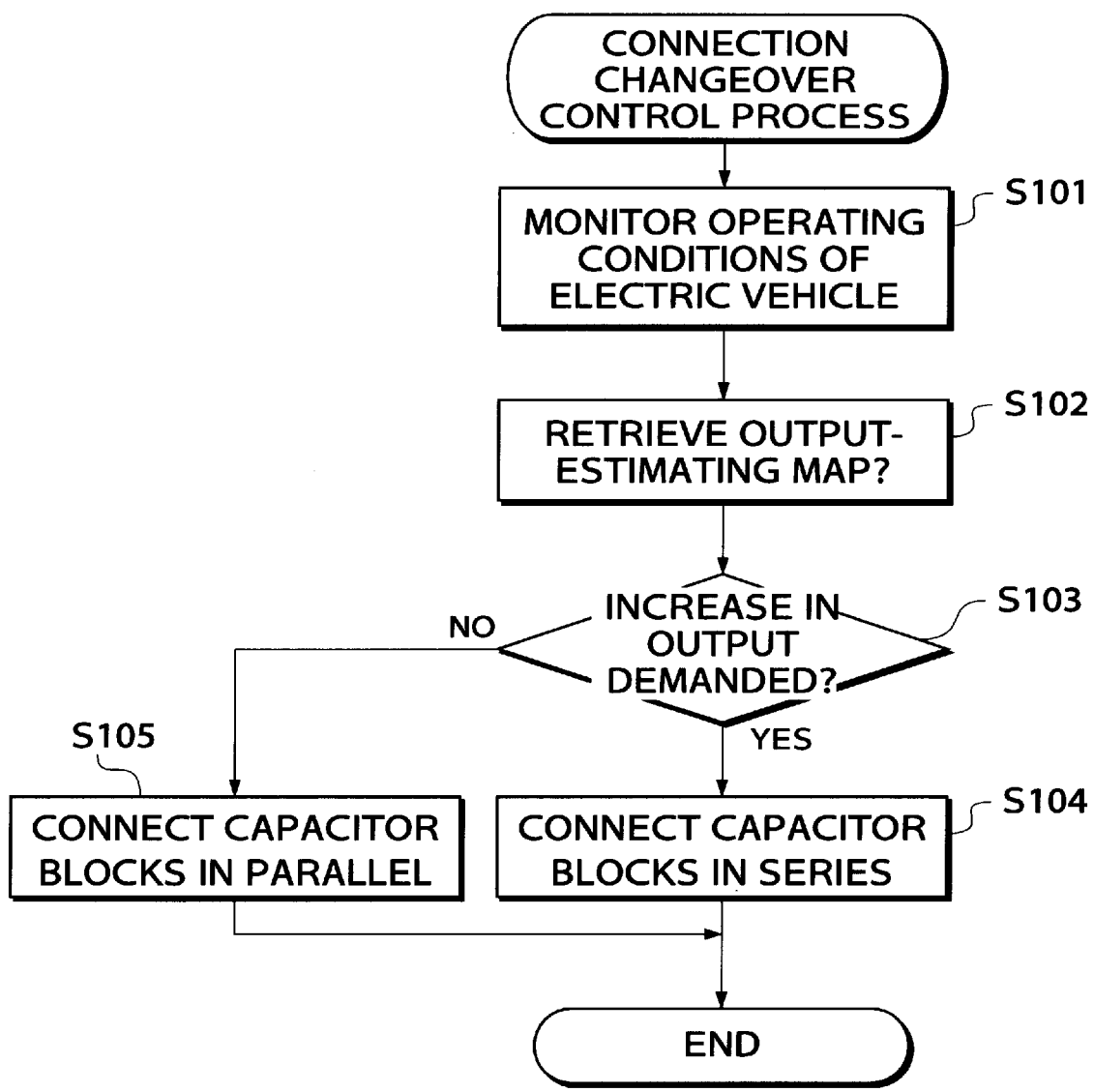
FIG. 16 is a flowchart showing a routine for carrying out a connection changeover control process executed by a motor control ECU 25 of the FIG. 15 power supply unit.

FIG. 16 shows a routine for carrying out a connection changeover control process executed by the motor control ECU 25. First, the motor control ECU 25 monitors operating conditions of the electric vehicle at a step S101, and retrieves an output demanded of the electric motor 16 from the output-prediction map 131 based on output signals from the accelerator opening sensor 125 and from the inclination angle sensor 128 at a step S102.

From the retrieved value of demanded output, it is determined at a step S103 whether it is demanded to increase the output of the power supply unit. When an increase in the output of the power supply unit is demanded e.g. when the vehicle is climbing on an ascending slope or it is suddenly accelerated, the motor control ECU 25 delivers a command to change the manner of connection of the capacitor blocks from parallel connection to series connection to the capacitor management ECU 21 at a step S104, whereas when no increase in the output is demanded, the motor control ECU 25 delivers a command to change the manner of connection of the capacitor blocks from series connection to parallel connection to the capacitor management ECU 21 at a step S105.

As shown in FIG. 8, also referred to in describing the second embodiment, when an increase in the output of the power supply unit is demanded, the manner of connection of the capacitors is changed over from parallel connection to series connection e.g. at an efficiency of 80%, thereby obtaining the required output, whereas when a decrease in the output is demanded, the manner of connection of the capacitors is changed over from series connection to parallel connection at a predetermined efficiency with a hysteresis relative to 80%, to thereby enhance the power conversion efficiency. That is, the power conversion efficiency is increased than when the output is reduced with the capacitors remaining connected in series, by an amount as shown in the hatched area in FIG. 8.

As described above, according to the third embodiment, operating conditions of the electric vehicle are monitored and when an increase in the output is required during traveling of the vehicle on an ascending slope or upon sudden acceleration of the vehicle, the manner of connection of the capacitor blocks is changed over from parallel connection to series connection to thereby secure a large output, whereas when a normal level of output is again required, the manner of connection of the capacitor blocks is changed from series connection to parallel connection to thereby reduce the amount of heat generated within the capacitors, whereby it is possible to enhance the power conversion efficiency.

Therefore, since the amount of heat generated within a capacitor is determined by the internal resistance of the capacitor, capacitors having a high internal resistance can be employed for the capacitor blocks, and hence the capacitor blocks can be formed by electric double-layer capacitors in which collector electrodes and materials between the collector electrodes are densely formed, whereby large-capacity capacitors suitable for electric vehicles can be mounted on electric vehicles.

It should be noted that according to the present embodiment as well, similarly to the first embodiment, when the output voltage from the capacitor blocks becomes equal to or lower than a predetermined value, the manner of connection of the capacitor blocks is changed over to series connection regardless of the output demanded by the load.

Next, a fourth embodiment of the invention will be described.

The present embodiment is distinguished from the third embodiment in that a switching regulator circuit incorporating a smoothing circuit, as mentioned with reference to FIGS. 11A to 11B3, is employed. The remainder of the arrangement of the present embodiment is similar to that of the third embodiment, and component elements and parts of the present embodiment corresponding to those of the third embodiment are designated by identical reference numerals, and description thereof is omitted.

More specifically, a power supply unit 1 according to the present embodiment is comprised of a capacitor block 3' having a plurality of electric double-layer capacitors connected in series, a switching regulator 11' having an input smoothing circuit, and a capacitor management ECU 21.

According to the present embodiment, as is distinct from the above embodiments, the power supply unit 1 can provide a high output enough for the power consumption of the electric vehicle, with a reduced amount of heat generated within the capacitors, and a high power conversion efficiency, which are close to those of the ideal power conversion circuit, without employing a plurality of capacitor blocks and changing the manner of connection of the capacitor blocks.

What is claimed is:

1. A power supply unit comprising:
   a capacitor unit for supplying electric power to a load, said capacitor unit having at least two blocks each having a plurality of electric double-layer capacitors connected in series;
   a selector switch for changing over a manner of connection of said at least two blocks between series connection and parallel connection in dependence on an output required by said load; and
   a switching regulator connected to said capacitor unit.

2. A power supply unit according to claim 1, wherein said power supply unit is installed on an automotive vehicle, said power supply unit including operating condition-detecting means for detecting operating conditions of said automotive vehicle, and output-estimating means for estimating said output required by said load based on said operating conditions of said automotive vehicle detected by said operating condition-detecting means, said selector switch changing over said manner of connection of said at least two blocks between said series connection and said parallel connection in dependence on said output estimated by said output-estimating means.

3. A power supply unit according to claim 2, wherein said automotive vehicle has an accelerator pedal, said operating condition-detecting means including an accelerator position sensor for detecting a position of said accelerator pedal, and an inclination angle sensor for detecting a gradient of a road on which said automotive vehicle is traveling.

4. A power supply unit according to claim 1, including command-receiving means for receiving a command concerning said output required by said load, said selector switch connecting said at least two blocks in said series connection when said command concerning said output is for increasing said electric power, and connecting said at least two blocks in said parallel connection when said command concerning said output is for giving priority to power conversion efficiency.

5. A power supply unit according to claim 4, including voltage control means for controlling output voltage of said capacitor unit to a predetermined value to thereby supply said electric power to said load, and a voltage sensor for detecting said output voltage of said capacitor unit, said selector switch changing over said manner of connection of said at least two blocks from said parallel connection to said series connection when said output voltage of said capacitor unit is below said predetermined value.

6. A power supply unit according to claim 4, wherein said power supply unit is installed on an automotive vehicle, said load comprising an electric motor, said power supply unit including a driver for driving said electric motor, and required output-detecting means for detecting said output required by said load based on an output from said driver, said selector switch changing over said manner of connection of said at least two blocks between said series connection and said parallel connection in dependence on said output detected by said required output-detecting means.

7. An electric vehicle comprising:

power supply unit for supplying electric power to a load, said power supply having at least two blocks each having a plurality of electric double-layer capacitors connected in series, a selector switch for changing over a manner of connection of said at least two blocks between series connection and parallel connection, and an electric motor as said load to which said power supply unit supplies said electric power;

operating condition-detecting means for detecting operating conditions of said automotive vehicle; and a management ECU for causing said selector switch to change over said manner of connection of said at least two blocks between said series connection and said parallel connection based on said operating conditions of said electric vehicle detected by said operating condition-detecting means.

8. An electric vehicle according to claim 7, wherein said electric vehicle has an accelerator pedal, said operating condition-detecting means including an accelerator position sensor for detecting a position of said accelerator pedal, and an inclination angle sensor for detecting a gradient of a road on which said automotive vehicle is traveling.

9. A power supply unit comprising:

a capacitor unit for supplying electric power to a load, said capacitor unit having a plurality of electric double-layer capacitors connected in series; and a switching regulator connected to said capacitor unit, said switching regulator including a smoothing circuit for smoothing ripples in an output voltage of said power supply unit, which is caused by switching operation of said switching regulator.

* * * * *